US012120791B1

(12) United States Patent
Shao

(10) Patent No.: US 12,120,791 B1
(45) Date of Patent: Oct. 15, 2024

(54) LIGHT EMITTING DIODE HYBRID LIGHT STRING

(71) Applicant: Shu-Fa Shao, New Taipei (TW)

(72) Inventor: Shu-Fa Shao, New Taipei (TW)

( * ) Notice: Subject to any disclaimer, the term of this patent is extended or adjusted under 35 U.S.C. 154(b) by 0 days.

(21) Appl. No.: 18/678,230

(22) Filed: May 30, 2024

(30) Foreign Application Priority Data

May 7, 2024 (CN) ......................... 202410555415.9

(51) Int. Cl.
*H05B 45/30* (2020.01)
*H05B 45/48* (2020.01)

(52) U.S. Cl.
CPC .................................... *H05B 45/48* (2020.01)

(58) Field of Classification Search
CPC ........ H05B 45/30; H05B 45/40; H05B 45/48; H05B 47/10; H05B 47/155
See application file for complete search history.

(56) References Cited

U.S. PATENT DOCUMENTS

2016/0055823 A1* 2/2016 Feng .................... G09G 3/3426 345/690

* cited by examiner

*Primary Examiner* — Jimmy T Vu
(74) *Attorney, Agent, or Firm* — McClure, Qualey & Rodack, LLP

(57) ABSTRACT

A light emitting diode hybrid light string includes a first conducting wire, a second conducting wire, a control module, a plurality of light emitting diodes, and a light emitting regulation assembly. The control module is configured to synthesize a communication command signal and a drive signal to generate a synthesized signal and output the synthesized signal to the first conducting wire and the second conducting wire. The light emitting diodes are connected in parallel between the first conducting wire and the second conducting wire, and generate first light emission according to the drive signal. The light emitting regulation assembly is connected in parallel between the first conducting wire and the second conducting wire, and configured to generate second light emission according to the communication command signal.

10 Claims, 7 Drawing Sheets

LIGHT EMITTING DIODE HYBRID LIGHT STRING

CROSS-REFERENCE TO RELATED APPLICATION

This non-provisional application claims priority under 35 U.S.C. § 119 (a) to Patent Application No. 202410555415.9 filed in China on May 7, 2024, the entire contents of which are hereby incorporated by reference.

BACKGROUND

Technical Field

The present invention relates to a light emitting diode hybrid light string, and in particular, to a light emitting diode hybrid light string that can respectively control light emitting diodes and a light emitting regulation assembly through a synthesized signal to produce light emitting changes.

Related Art

Currently, the control of light strings is to control light emitting actions of light emitting diodes through drive signals. However, the current control manner can only perform simple control on the light emitting diodes and cannot meet users' visual requirements for changes in the light strings.

SUMMARY

In view of this, a light emitting diode hybrid light string is provided, including a first conducting wire, a second conducting wire, a control module, a plurality of light emitting diodes, and a light emitting regulation assembly. The control module is configured to synthesize a communication command signal and a drive signal to generate a synthesized signal and output the synthesized signal to the first conducting wire and the second conducting wire. The light emitting diodes are connected in parallel between the first conducting wire and the second conducting wire, and generate first light emission according to the drive signal. The light emitting regulation assembly is connected in parallel between the first conducting wire and the second conducting wire, and configured to generate second light emission according to the communication command signal.

In some embodiments, the communication command signal is an always-on command, and the synthesized signal is a superimposition of the always-on command and the drive signal.

In some embodiments, the control module superimposes the always-on command on the drive signal at a command frequency to generate the synthesized signal.

In some embodiments, the command frequency includes a first command time and a second command time; in a first light emitting mode, the control module intermittently issues the always-on command with the first command time within the second light emitting time; and in a second light emitting mode, the control module intermittently executes the first light emitting mode with the second command time, where the second command time is longer than the first command time.

In some embodiments, the drive signal has a first light emitting time, the communication command signal has a second light emitting time, and the first light emitting time is longer than the second light emitting time.

In some embodiments, the light emitting regulation assembly has a light emitting address, the communication command signal has a communication address, and the light emitting regulation assembly generates the second light emission when the light emitting address matches the communication address.

In some embodiments, the light emitting regulation assembly includes a light emitting module and a drive module. The light emitting module is connected in parallel between the first conducting wire and the second conducting wire, and generates the second light emission when being driven. The drive module is connected in parallel between the first conducting wire and the second conducting wire, and configured to drive the light emitting module according to the communication command signal.

In some embodiments, one of the light emitting diodes has a first conduction direction, another of the light emitting diodes has a second conduction direction, and the first conduction direction is opposite to the second conduction direction.

In some embodiments, there are a plurality of light emitting regulation assemblies, one of the light emitting regulation assemblies has a first conduction direction, another of the light emitting regulation assemblies has a second conduction direction, and the first conduction direction is opposite to the second conduction direction.

In some embodiments, a light emitting diode hybrid light string is provided, including a first conducting wire, a second conducting wire, a control module, and a plurality of light emitting groups. The control module is configured to synthesize a communication command signal and a drive signal to generate a synthesized signal and output the synthesized signal to the first conducting wire and the second conducting wire. The plurality of light emitting groups are connected in series to the control module. Each light emitting group includes a plurality of light emitting diodes and a light emitting regulation assembly. The light emitting diodes generate first light emission according to the drive signal. The light emitting regulation assembly is connected in parallel to the light emitting diodes, and configured to generate second light emission according to the communication command signal.

Based on the above, in some embodiments, the light emitting diode hybrid light string may synthesize a communication command signal and a drive signal to generate a synthesized signal and output the synthesized signal to the first conducting wire and the second conducting wire through the control module. The plurality of light emitting diodes are connected in parallel between the first conducting wire and the second conducting wire, and generate first light emission according to the drive signal. The light emitting regulation assembly is connected in parallel between the first conducting wire and the second conducting wire, and configured to generate second light emission according to the communication command signal. In this way, the control module may control light emitting effects of the light emitting diodes and/or the light emitting regulation assembly by adjusting the communication command signal and the drive signal. Therefore, the light emitting diode hybrid light string may configure the quantities of light emitting diodes and light emitting regulation assemblies according to needs (product costs or light emitting effects). For example, two or more light emitting diodes are matched with a single light emitting regulation assembly (three light emitting diodes are matched with a single light emitting regulation assembly, four light emitting diodes are matched with a single light emitting regulation assembly, or five light emitting diodes are matched with a single light emitting regulation assembly. Alternatively, two or more light emitting diodes may be matched with two or more light emitting regulation assemblies (five light emitting diodes may be matched with two light emitting regulation assemblies, five light emitting diodes may be matched with three light emitting regulation assemblies, or five light emitting diodes may be matched with four light emitting regulation assemblies). Alternatively, the quantity of light emitting diodes may be the same as the quantity of light emitting regulation assemblies. Alternatively, the quantity of light emitting diodes may be smaller than the quantity of light emitting regulation assemblies.

The following describes the present invention in detail with reference to the accompanying drawings and specific embodiments, but shall not be used as a limitation on the present invention.

DETAILED DESCRIPTION

The following describes the technical solution of the present invention in detail with reference to the accompanying drawings and specific embodiments for further understanding of the objectives, solutions, and effects of the present invention, but shall not be used as a limitation on the protection scope of the claims appended to the present invention.

Figure 1:
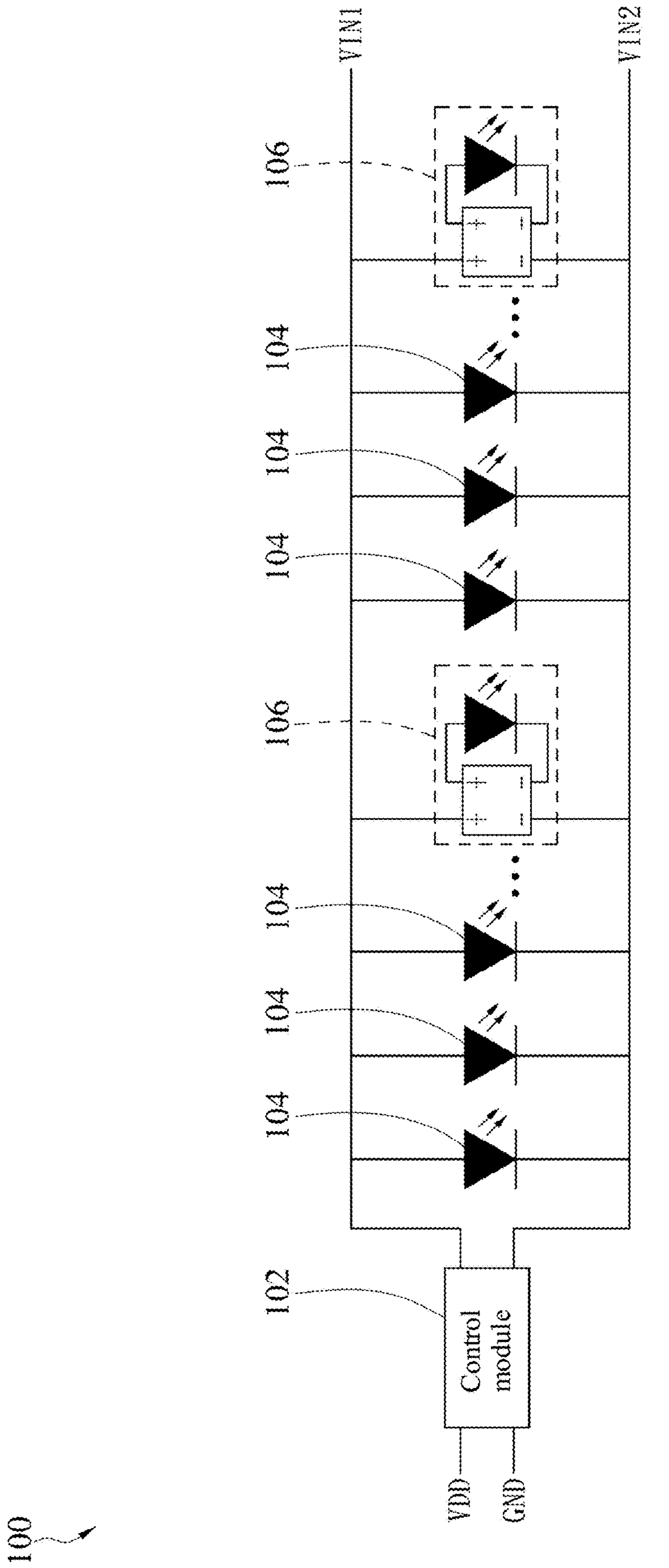
FIG. 1 is a block diagram of a light emitting diode hybrid light string according to some embodiments of the present invention.
Figure 2:
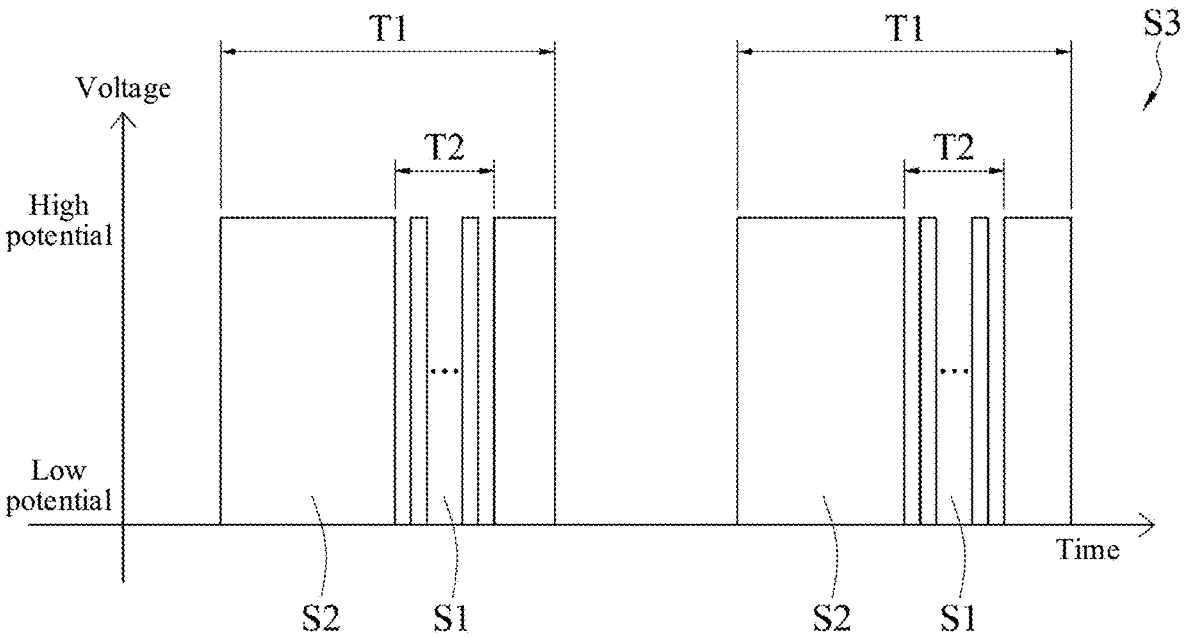
FIG. 2 is a waveform diagram of a synthesized signal according to some embodiments of the present invention.

FIG. 1 is a block diagram of a light emitting diode hybrid light string according to some embodiments of the present invention. FIG. 2 is a waveform diagram of a synthesized signal according to some embodiments of the present invention. As shown in FIG. 1 and FIG. 2, a light emitting diode hybrid light string 100 includes a first conducting wire VIN1, a second conducting wire VIN2, a control module 102, a plurality of light emitting diodes 104, and a light emitting regulation assembly 106. The control module 102 is configured to synthesize a communication command signal S1 and a drive signal S2 to generate a synthesized signal S3 and output the synthesized signal S3 to the first conducting wire VIN1 and the second conducting wire VIN2. The light emitting diodes 104 are connected in parallel between the first conducting wire VIN1 and the second conducting wire VIN2, and generate first light emission according to the drive signal S2. The light emitting regulation assembly 106 is connected in parallel between the first conducting wire VIN1 and the second conducting wire VIN2, and configured to generate second light emission according to the communication command signal S1.

The control module 102 may be connected to a power supply to obtain an input voltage from the power supply. For example, the control module 102 in FIG. 1 has a first input terminal VDD and a second input terminal GND. There is a potential difference between the first input terminal VDD and the second input terminal GND, which provides the operation of the control module 102, the light emitting diodes 104, and the light emitting regulation assembly 106. In some embodiments, after the first conducting wire VIN1 and the second conducting wire VIN2 are connected to the control module 102, the first input terminal VDD and the second input terminal GND generate a high potential and a low potential respectively. It may mean that the first input terminal VDD receives a high potential (working voltage), and the second input terminal GND receives a low potential (ground voltage). It may alternatively be that the first input terminal VDD receives a low potential and the second input terminal GND receives a high potential. In some embodiments, the first conducting wire VIN1 is parallel to the second conducting wire VIN2. The light emitting diodes 104 and the light emitting regulation assembly 106 are respectively coupled between the first conducting wire VIN1 and the second conducting wire VIN2 to form a long strip-shaped light string structure.

The control module 102 may be, for example, a central processing unit (CPU), a microcontroller unit (MCU), a digital signal processor (DSP), an application specific integrated circuit (ASIC), or other circuit combinations that can output the foregoing synthesized signal S3. That "the control module 102 is configured to synthesize a communication command signal S1 and a drive signal S2 to generate a synthesized signal S3 and output the synthesized signal S3 to the first conducting wire VIN1 and the second conducting wire VIN2" may mean that the control module 102 carries the communication command signal S1 on the drive signal S2 to generate a synthesized signal S3, and outputs the synthesized signal S3 to the first conducting wire VIN1 and the second conducting wire VIN2, so that the light emitting diodes 104 and/or the light emitting regulation assembly 106 can emit light according to the synthesized signal S3. In some embodiments, the control module 102 may receive a control command and generate a synthesized signal S3 according to the control command. The control command may be pre-stored in the control module 102. When the control module 102 is driven, the control command may be accessed to generate and send the synthesized signal S3. The control command may alternatively be sent to the control module 102 by an electronic device (such as a mobile phone, a computer, or a tablet computer having a wireless transmission function) provided outside the light emitting diode hybrid light string 100, so that the control module 102 receives the control command through a wireless transmission channel, and generates and sends the synthesized signal S3 accordingly. In this way, the user can input a control command to the electronic device according to needs, to remotely adjust changes in the first light emission and the second light emission.

The light emitting diode 104 may be a micro light emitting diode, an organic light emitting diode (OLED), a quantum dot LED (QLED), a mini light emitting diode (Mini LED), or a polymer light emitting diode (PLED). The first light emission generated by the light emitting diodes 104 may refer to the light emitting action (presenting a light emitting state) generated when the light emitting diodes 104 are driven. In some embodiments, the light emitting diodes 104 may be arranged between the first conducting wire VIN1 and the second conducting wire VIN2 with a single light emitting color. Alternatively, the light emitting diodes 104 may be sequentially arranged between the first conducting wire VIN1 and the second conducting wire VIN2 with a plurality of light emitting colors, so that the light emitting diode hybrid light string 100 produces different visual effects. In some embodiments, as shown in FIG. 2, the drive signal S2 may be a combination of a high potential and a low potential. For example, when the drive signal S2 is at a high potential (an input voltage is at a high potential), the light emitting diodes 104 may generate the first light emission. When the drive signal S2 is at a low potential (the input voltage is 0 V), the light emitting diodes 104 do not generate the first light emission (present an off state).

In some embodiments, as shown in FIG. 2, the drive signal S2 has a first light emitting time T1, the communication command signal S1 has a second light emitting time T2, and the first light emitting time T1 is longer than the second light emitting time T2. It should be noted that because the second light emitting time T2 of the communication command signal S1 is shorter than the time during which the human eye can perceive a light emitting change, even if the light emitting diodes 104 are interfered by the communication command signal S1, the user will not visually notice changes of the first light emission of the light emitting diodes 104. In some embodiments, the first light emitting time T1 is longer than or equal to 0.3 seconds. In some embodiments, the second light emitting time T2 is shorter than 0.03 seconds.

That the light emitting regulation assembly 106 is configured to generate second light emission according to the communication command signal S1 may mean that when the synthesized signal S3 is transmitted through the first conducting wire VIN1 and the second conducting wire VIN2, the light emitting regulation assembly 106 is only controlled by the communication command signal S1 in the synthesized signal S3 to generate the second light emission, and is not controlled by the drive signal S2. For example, when the light emitting regulation assembly 106 does not receive the communication command signal S1, the light emitting regulation assembly 106 may not generate the second light emission (remain off). In some embodiments, as shown in FIG. 2, the communication command signal S1 may be a combination of a high potential and a low potential. For example, when the communication command signal S1 is at a high potential, the light emitting regulation assembly 106 may generate the second light emission. When the drive signal S2 is at a low potential, the light emitting regulation assembly 106 does not generate the second light emission (off state).

As shown in FIG. 1, in some embodiments, the light emitting regulation assembly 106 has a light emitting address, and the communication command signal S1 has a communication address. The light emitting regulation assembly 106 generates the second light emission when the light emitting address matches the communication address. For example, the light emitting diode hybrid light string 100 may have a single or a plurality of light emitting regulation assemblies 106 connected in parallel, and each light emitting regulation assembly 106 has a different light emitting address. As shown in FIG. 2, a light emitting address of a first light emitting regulation assembly 106 may be, for example, a first light emitting address, and a light emitting address of a second light emitting regulation assembly 106 may be, for example, a second light emitting address. When the communication address in the communication command signal S1 sent by the control module 102 is the first light emitting address, when the first light emitting address matches the communication address, the first light emitting regulation assembly 106 generates the second light emission. In contrast, when the second light emitting address does not match the communication address, the second light emitting regulation assembly 106 does not generate the second light emission. In this way, the user can generate, through the control module 102, a communication command signal S1 with a communication address corresponding to a specified light emitting address, to control a specified light emitting regulation assembly 106 to generate the second light emission.

As shown in FIG. 2, in some embodiments, the communication command signal S1 includes an always-on command C1 (shown later in FIG. 3A). The synthesized signal S3 is a superimposition of the always-on command C1 and the drive signal S2. It should be noted that when the communication command signal S1 is the always-on command C1, the communication command signal S1 is at a high potential. When the drive signal S2 is an always-on signal, the drive signal S2 is at a high potential. When the control command is an always-on mode, the control module 102 superimposes the always-on command C1 on the drive signal S2 to generate the synthesized signal S3.

In some embodiments, the control module 102 superimposes the always-on command on the drive signal S2 at a command frequency to generate the synthesized signal S3. It should be noted that the command frequency may refer to being shorter than the time during which the human eye can perceive a light emitting change (which may refer to being shorter than 1/30 seconds). Therefore, after the always-on command is superimposed on the drive signal S2, visually, the light emitting regulation assembly 106 can be always on, and the light emitting diodes 104 will not be interfered by the always-on command and also remain always on.

Figure 3A:
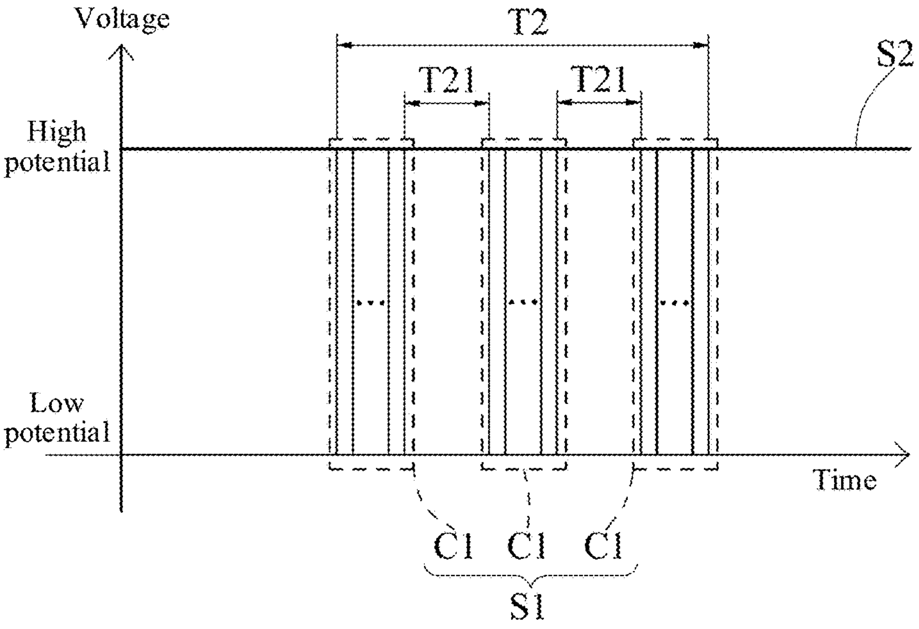
FIG. 3A is a waveform diagram of a communication command signal when a control module is in a first light emitting mode according to some embodiments of the present invention.
Figure 3B:
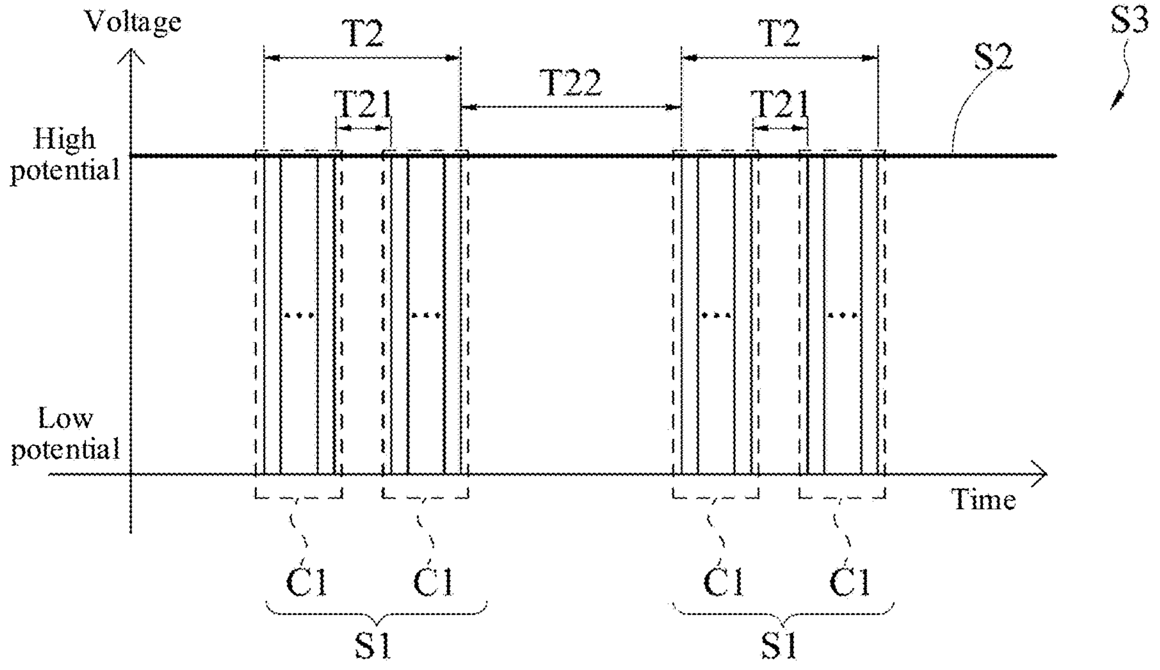
FIG. 3B is a waveform diagram of a communication command signal when a control module is in a second light emitting mode according to some embodiments of the present invention.

Refer to FIG. 1, FIG. 2, FIG. 3A, and FIG. 3B together. FIG. 3A is a waveform diagram of a communication command signal when a control module is in a first light emitting mode according to some embodiments of the present invention. FIG. 3B is a waveform diagram of a communication command signal when a control module is in a second light emitting mode according to some embodiments of the present invention. In some embodiments, the control module

102 may adjust the command frequency according to the first light emitting mode, the second light emitting mode, or a third light emitting mode. Specifically, the command frequency includes a first command time T21 and a second command time T22. In the first light emitting mode, the control module 102 intermittently issues the always-on command C1 with the first command time T21 within the second light emitting time T2. In the second light emitting mode, the control module 102 intermittently execute the first light emitting mode with the second command time T22. In the third light emitting mode, the control module 102 intermittently executes the first light emitting mode with the second command time T22, and the second light emitting time T2 is substantially equal to the second command time T22. The second command time T22 is longer than the first command time T21.

As shown in FIG. 3A, the first light emitting mode may refer to the always-on mode. The control module 102 uses the first command time T21 as a sending interval of a plurality of commands to send the always-on command C1 within the second light emitting time T2. The light emitting regulation assembly 106 may repeatedly generate the second light emission during the second light emitting time T2 according to the always-on command C1 to achieve a visually always-on effect (always-on mode).

As shown in FIG. 3B, the second light emitting mode may refer to a flickering mode. The control module 102 uses the second command time T22 as an execution interval time for executing the first light emitting mode, and repeatedly executes the first light emitting mode for a specified quantity of cycles. It should be noted that when the second command time T22 is longer than the first command time T21, and the second command time T22 reaches the time during which a light emitting change can be perceived visually (which may refer to being longer than 1/30 seconds), the light emitting regulation assembly 106 can visually produce a perceptible on and off alternating effect (flickering mode).

Figure 3C:
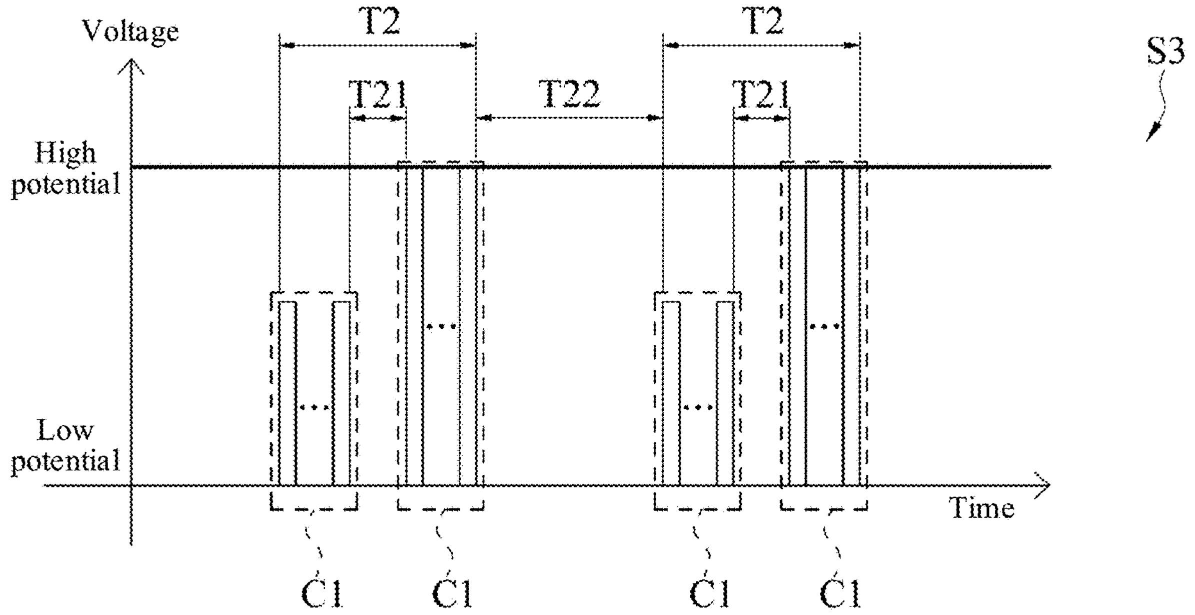
FIG. 3C is a waveform diagram of a communication command signal when a control module is in a third light emitting mode according to some embodiments of the present invention.

FIG. 3C is a waveform diagram of a communication command signal when a control module is in a third light emitting mode according to some embodiments of the present invention. In some embodiments, the communication command signal S1 is a combination of the always-on command C1 and a voltage command. In the third light emitting mode, the control module 102 intermittently executes the first light emitting mode with the second command time T22, where the control module 102 gradually increases the input voltage within the second light emitting time T2, and gradually reduces the input voltage within the second command time T22 according to the voltage command. As shown in FIG. 3C, the third light emitting mode may refer to a breathing mode. When the control module 102 executes the second light emitting mode, the second command time T22 is used as an execution interval to intermittently execute the first light emitting mode. The voltage command can control the voltage of the communication command signal S1 (between a high potential and a low potential). The control module 102 gradually increases the input voltage from a low potential (which may be 0 V or ½ high potential) to a high potential within the second light emitting time T2, and gradually reduces the input voltage from a high potential to a low potential (which may be ½ high potential or 0 V) within the second command time T22. The light emitting regulation assembly 106 is enabled to visually produce visual effects of gradual light emitting and gradually off (breathing mode).

In some embodiments, the control module 102 may alternatively control the light emitting regulation assembly 106 to execute the third light emitting mode by using the always-on command C1, the first command time T21, and the second command time T22. For example, during the second light emitting time T2, the control module 102 first gradually reduces the second command time T22, and then gradually increases the second command time T22. The brightness of the light emitting regulation assembly 106 may visually produce a corresponding gradual change (breathing mode) according to a gradual change in the sending time of the always-on command C1. For example, in a case that the second command time T22 is shortened, the always-on command C1 is sent intensively, so that the brightness generated by the light emitting regulation assembly 106 visually is relatively high. On the contrary, in a case that the second command time T22 is increased, the sending interval of the always-on command C1 is relatively long, so that the brightness generated by the light emitting regulation assembly 106 visually is relatively low.

Figure 3D:
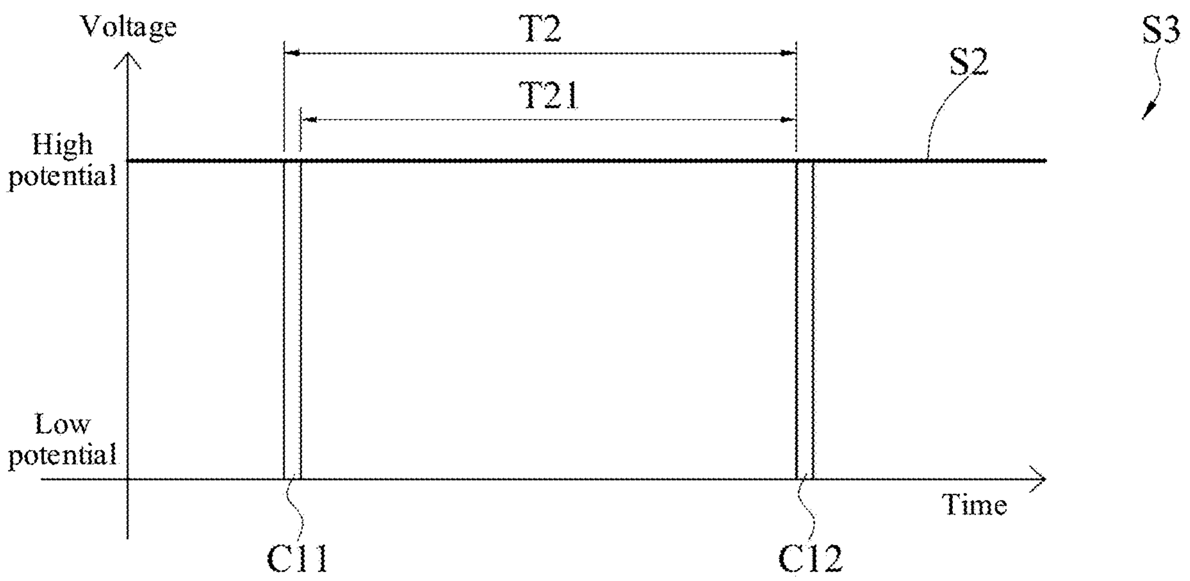
FIG. 3D is a waveform diagram of a synthesized signal according to some embodiments of the present invention, showing sending time points of a first always-on command and a second always-on command.

FIG. 3D is a waveform diagram of a synthesized signal according to some embodiments of the present invention, showing sending time points of a first always-on command and a second always-on command. In some embodiments, that the light emitting regulation assembly 106 is configured to generate second light emission according to the communication command signal S1 may mean that the control module 102 determines the second light emitting time T2 by setting the first command time T21. As shown in FIG. 3D, when obtaining a first always-on command C11, the light emitting regulation assembly 106 generates the second light emission. When obtaining a second always-on command C12, the light emitting regulation assembly 106 does not generate the second light emission. The first always-on command C11 and the second always-on command C12 are separated by the first command time T21, and the first command time T21 is substantially equal to the second command time T22.

Figure 3E:
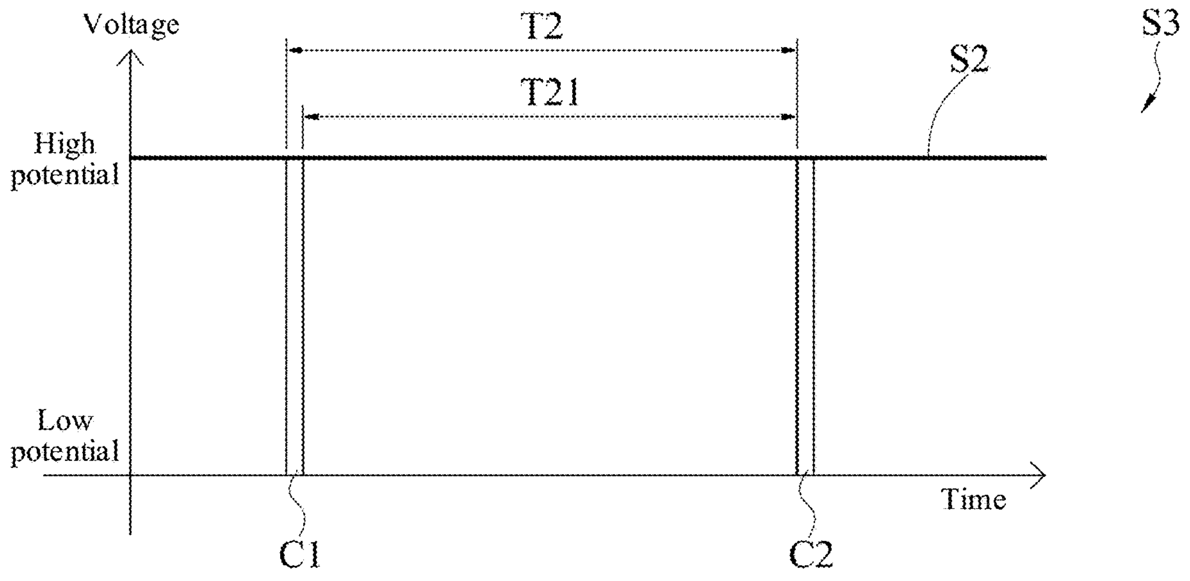
FIG. 3E is a waveform diagram of a synthesized signal according to some embodiments of the present invention, showing sending time points of an always-on command and an always-off command in a communication command signal.

FIG. 3E is a waveform diagram of a synthesized signal according to some embodiments of the present invention, showing sending time points of an always-on command and an always-off command in a communication command signal. In some embodiments, the communication command signal includes an always-on command C1 and an always-off command C2. The light emitting regulation assembly 106 is configured to generate the second light emission according to the always-on command C1 and not generate the second light emission according to the always-off command C2. As shown in FIG. 3E, when the control module 102 superimposes the always-on command C1 on the drive signal S2 of the synthesized signal S3, the light emitting regulation assembly 106 may generate the second light emission according to the always-on command C1. After the control module 102 issues the always-on command C1 and the first command time T21 is reached, the control module 102 issues the always-off command C2. The light emitting regulation assembly 106 may not generate the second light emission according to the always-off command C2. The first command time T21 is substantially equal to the second command time T22. It should be noted that the always-on command may be to increase the input voltage to a high potential (which may be between ½ high potential and the high potential), and the always-off command C2 may be to reduce the input voltage to a low potential (0 V).

As shown in FIG. 1 and FIG. 2, in some embodiments, the drive signal S2 is a pulse width modulation signal, and the plurality of light emitting diodes 104 selectively generate the first light emission according to the pulse width modulation signal. It may mean that when the pulse width modulation signal is at a high potential, the light emitting diode 104 generates the first light emission. When the pulse width modulation signal is at a low potential, the light emitting diode 104 does not generate the first light emission. In this way, the control module 102 can adjust the pulse width modulation signal to change the first light emission of the light emitting diode 104. In some embodiments, when the light emitting diode 104 is set to be always on, the control module 102 may continuously update a duty ratio of the pulse width modulation signal, so that the light emitting diode 104 can visually produce a state of continuous light emitting and being always on. The control module 102 can also change the brightness of the light emitting diode 104 by changing the duty ratio.

Figure 4:
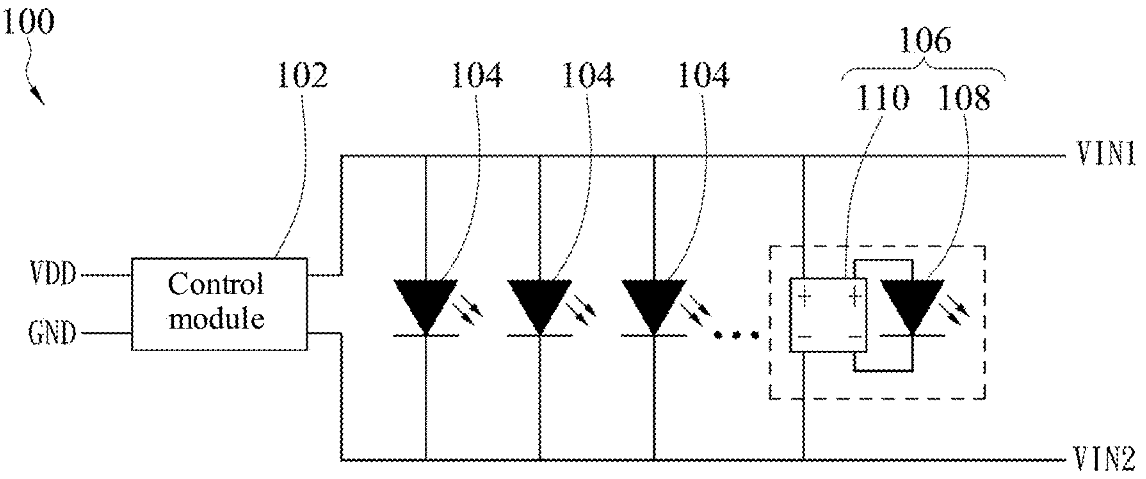
FIG. 4 is a block diagram of a light emitting regulation assembly according to some embodiments of the present invention.

FIG. 4 is a block diagram of a light emitting regulation assembly according to some embodiments of the present invention. As shown in FIG. 4, the light emitting regulation assembly 106 includes a light emitting module 108 and a drive module 110. The light emitting module 108 is connected in parallel between the first conducting wire VIN1 and the second conducting wire VIN2, and generates the second light emission when being driven. The drive module 110 is connected in parallel between the first conducting wire VIN1 and the second conducting wire VIN2, and configured to drive the light emitting module 108 according to the communication command signal S1. The light emitting module 108 may be, for example, a micro light emitting diode, an organic light emitting diode (OLED), a quantum dot LED (QLED), a mini light emitting diode (Mini LED), or a polymer light emitting diode (PLED). The drive module 110 may be, for example, a central processing unit (CPU), a microcontroller unit (MCU), a digital signal processor (DSP), an application specific integrated circuit (ASIC), or other circuit combinations that can process the communication command signal S1. In some embodiments, when the communication command signal S1 is a light emitting signal, the drive module 110 may drive the light emitting module 108 to generate the second light emission.

Figure 5:
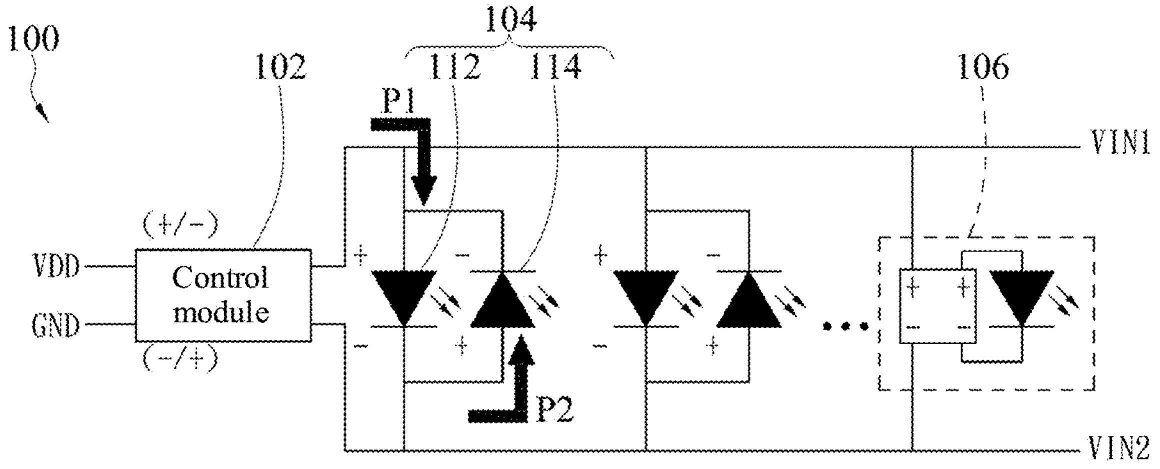
FIG. 5 is a block diagram (1) of a light emitting diode hybrid light string according to some other embodiments of the present invention.

FIG. 5 is a block diagram (1) of a light emitting diode hybrid light string according to some other embodiments of the present invention. As shown in FIG. 5, one of the light emitting diodes 104 has a first conduction direction P1, another of the light emitting diodes 104 has a second conduction direction P2, and the first conduction direction P1 is opposite to the second conduction direction P2. For example, the light emitting diode 104 in FIG. 5 is divided into a first light emitting diode 112 and a second light emitting diode 114 according to the conduction direction. When the conduction direction of the first light emitting diode 112 is the first conduction direction P1, the first light emitting diode 112 may generate the first light emission according to the drive signal S2, while the second light emitting diode 114 does not generate the first light emission. On the contrary, when the conduction direction of the drive signal S2 is the second conduction direction P2, the second light emitting diode 114 may generate the first light emission according to the drive signal S2, while the first light emitting diode 112 does not generate the first light emission. In some embodiments, the first light emitting diode 112 and the second light emitting diode 114 may be adapted to the drive signal S2 in different conduction directions. In this way, the first light emitting diode 112 and the second light emitting diode 114 may be light emitting diodes with the same or different colors, and a visual effect that the first light emitting diode 112 and the second light emitting diode 114 emit light in turn is produced.

Figure 6:
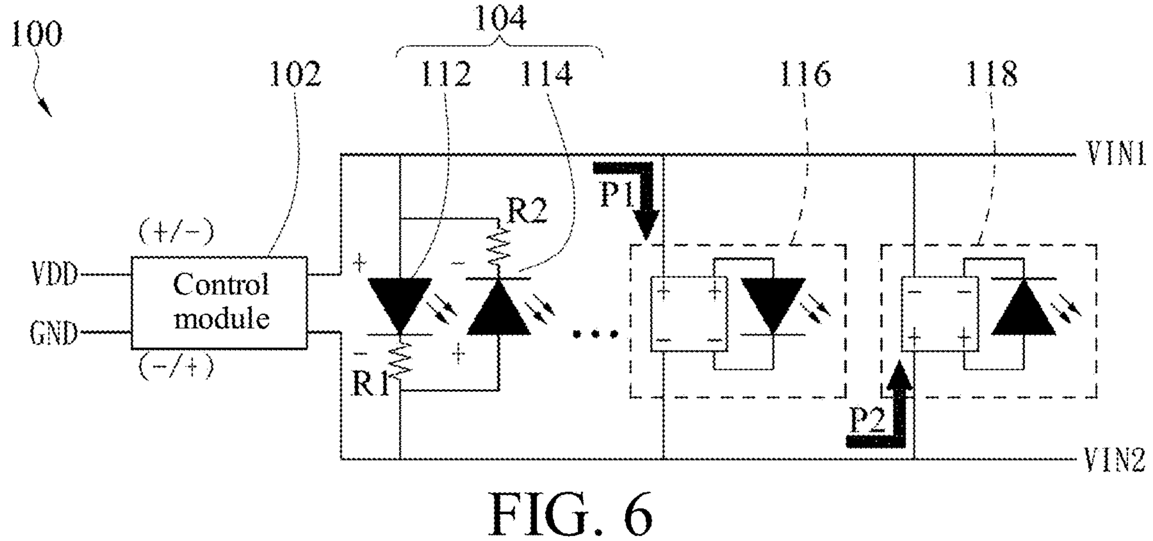
FIG. 6 is a block diagram (2) of a light emitting diode hybrid light string according to some other embodiments of the present invention.

FIG. 6 is a block diagram (2) of a light emitting diode hybrid light string according to some other embodiments of the present invention. As shown in FIG. 6, there are a plurality of light emitting regulation assemblies 106, one of the light emitting regulation assemblies 106 has a first conduction direction P1, another of the light emitting regulation assemblies 106 has a second conduction direction P2, and the first conduction direction P1 is opposite to the second conduction direction P2. For example, the light emitting regulation assembly 106 in FIG. 6 is divided into a first light emitting regulation assembly 116 and a second light emitting regulation assembly 118 according to the conduction direction. When the conduction direction of the first light emitting regulation assembly 116 is the first conduction direction P1, the first light emitting regulation assembly 116 may generate the second light emission according to the communication command signal S1, while the second light emitting regulation assembly 118 does not generate the second light emission. On the contrary, when the conduction direction of the communication command signal S1 is the second conduction direction P2, the second light emitting regulation assembly 118 may generate the second light emission according to the communication command signal S1, while the first light emitting regulation assembly 116 does not generate the second light emission. In this way, the first light emitting regulation assembly 116 and the second light emitting regulation assembly 118 may be adapted to the communication command signal S1 in different conduction directions. For example, the first light emitting regulation assembly 116 and the second light emitting regulation assembly 118 (which refers to, for example, the light emitting regulation assembly 106 in FIG. 5) may be light emitting diodes with the same or different colors, and a visual effect that the first light emitting regulation assembly 116 and the second light emitting regulation assembly. 118 emit light in turn is produced.

Figure 7:
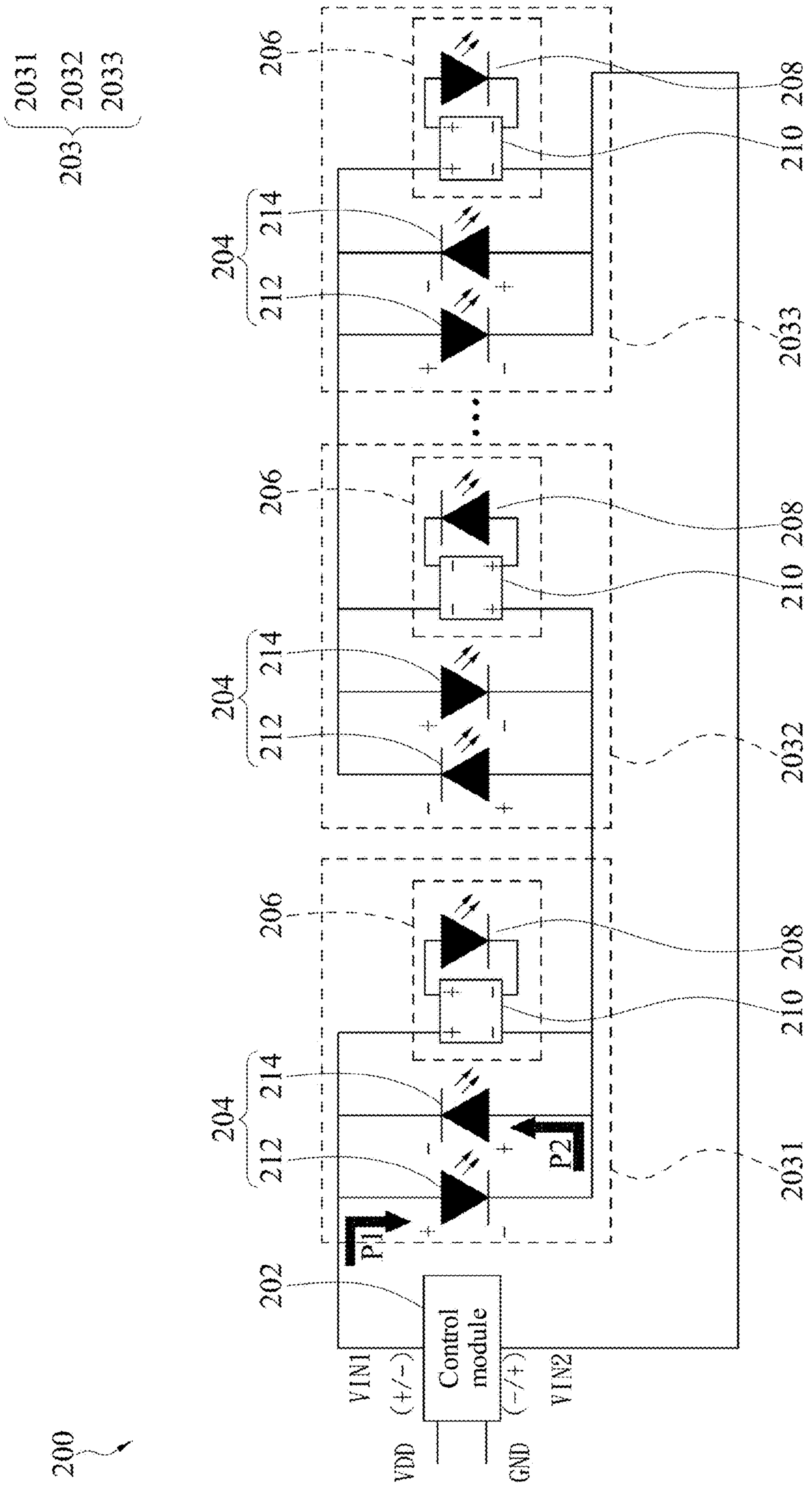
FIG. 7 is a block diagram (3) of a light emitting diode hybrid light string according to some other embodiments of the present invention.

In some embodiments, the light emitting diode hybrid light string 100 further includes a plurality of resistors (as shown in FIG. 7). One end of the resistor is coupled to the light emitting diode 104, and the other end thereof is coupled to one of the first conducting wire VIN1 and the second conducting wire VIN2. Specifically, one end of a first resistor R1 is coupled to an N terminal of the first light emitting diode 112, and the other end thereof is coupled to the second conducting wire VIN2. One end of a second resistor R2 is coupled to an N terminal of the second light emitting diode 114, and the other end thereof is coupled to the first conducting wire VIN1. The light emitting diode hybrid light string 100 can adjust the voltage of the first light emitting diode 112 and the second light emitting diode 114 through the first resistor R1 and the second resistor R2, so that the brightness of the first light emitting diode 112, the second light emitting diode 114, the first light emitting regulation assembly 116, and the second light emitting regulation assembly 118 is visually consistent.

FIG. 7 is a block diagram (3) of a light emitting diode hybrid light string according to some other embodiments of the present invention. As shown in FIG. 7, a light emitting diode hybrid light string 200 includes a first conducting wire VIN1, a second conducting wire VIN2, a control module 202, and a plurality of light emitting groups 203. The control module 202 is configured to synthesize a communication command signal S1 and a drive signal S2 to generate a synthesized signal S3 and output the synthesized signal S3 to the first conducting wire VIN1 and the second conducting wire VIN2. The plurality of light emitting groups 203 are connected in series to the control module 202. Each light emitting group 203 includes a plurality of light emitting diodes 204 and a light emitting regulation assembly 206. The light emitting diodes 204 generate first light emission according to the drive signal S2. The light emitting regulation assembly 206 is connected in parallel to the light emitting diodes 204, and configured to generate second light emission according to the communication command signal S1.

In some embodiments, in FIG. 7, the light emitting diode 204 is divided into a first light emitting diode 212 and a second light emitting diode 214 according to the conduction direction. When the conduction direction of the first light emitting diode 212 is the first conduction direction P1, the first light emitting diode 212 may generate the first light emission according to the drive signal S2, while the second light emitting diode 214 does not generate the first light emission. On the contrary, when the conduction direction of the drive signal S2 is the second conduction direction P2, the second light emitting diode 214 may generate the first light emission according to the drive signal S2, while the first light emitting diode 212 does not generate the first light emission. In some embodiments, the first light emitting diode 212 and the second light emitting diode 214 may be adapted to the drive signal S2 in different conduction directions.

For the control module 202, reference may be made to the description of the control module 102 in FIG. 1, FIG. 4, FIG. 5, or FIG. 6.

That "the light emitting group 203 is connected in series to the control module 202" may mean that a first light emitting group 2031, a second light emitting group 2032, and a third light emitting group 2033 in FIG. 7 are connected in series in sequence, the first light emitting group 2031 is coupled to one end of the control module 202, and the third light emitting group 2033 is coupled to the other end of the control module 202, to form a loop. It should be noted that the input voltage of a single light emitting group 203 is 3 V. In FIG. 7, the light emitting diode hybrid light string 200 has three light emitting groups (2031, 2032, 2033), and the input voltage thereof is approximately 9 V. The light emitting diode hybrid light string 200 being connected in series to nine light emitting groups 203 is then used as an example, and the working voltage of the nine light emitting groups 203 is 27 V. Considering the resistance of the first conducting wire VIN1 and the second conducting wire VIN2, the input voltage may be set to 31 V, and the rest may be deduced by analogy.

Figure 8:
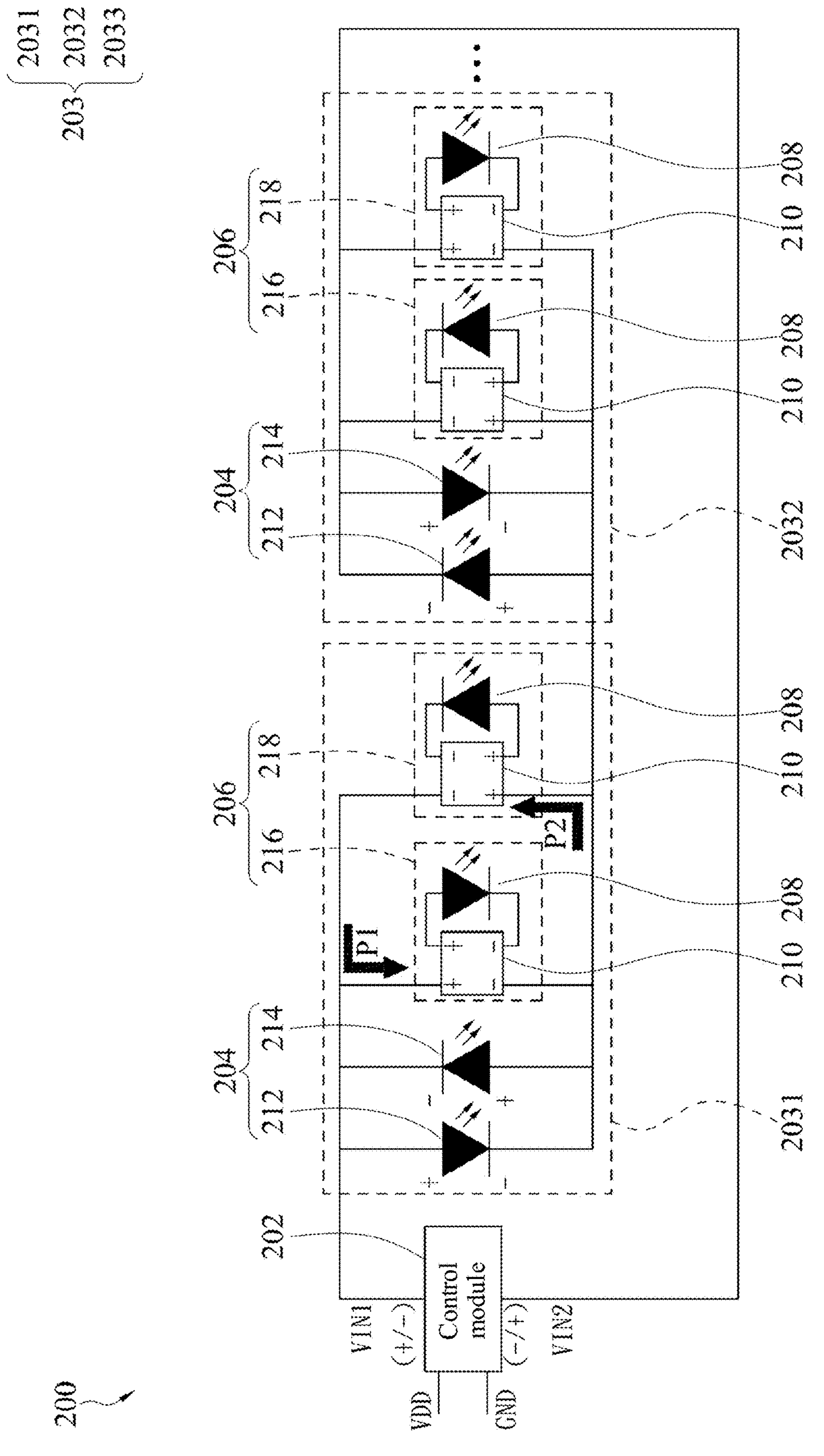
FIG. 8 is a block diagram (4) of a light emitting diode hybrid light string according to some other embodiments of the present invention.

FIG. 8 is a block diagram (4) of a light emitting diode hybrid light string according to some other embodiments of the present invention. As shown in FIG. 8, there may be a plurality of light emitting regulation assemblies 206. The light emitting regulation assembly 206 is divided into a first light emitting regulation assembly 216 and a second light emitting regulation assembly 218 according to the conduction direction. When the conduction direction of the first light emitting regulation assembly 216 is the first conduction direction P1, the first light emitting regulation assembly 216 may generate the first light emission according to the communication command signal S1, while the second light emitting regulation assembly 218 does not generate the first light emission. On the contrary, when the conduction direction of the communication command signal S1 is the second conduction direction P2, the second light emitting regulation assembly 218 may generate the first light emission according to the communication command signal S1, while the first light emitting regulation assembly 216 does not generate the first light emission. In this way, the plurality of light emitting groups (2031, 2032) connected in series in the light emitting diode hybrid light string 200 may be adapted to the voltage polarity of the communication command signal S1, and the first light emitting regulation assemblies 216 or the second light emitting regulation assemblies 218 of the light emitting groups (2031, 2032) are controlled to generate the second light emission.

For the light emitting diode 204, reference may be made to the description of the light emitting diode 104 in FIG. 1, FIG. 4, or FIG. 6.

For the light emitting regulation assembly 206, reference may be made to the description of the light emitting regulation assembly 106 in FIG. 1, FIG. 4, or FIG. 6. The light emitting regulation assembly 206 further includes a light emitting module 208 and a drive module 210. For the description of the light emitting module 208 and the drive module 210, reference may be made to the description of the light emitting module 108 and the drive module 110 in FIG. 1, FIG. 4, or FIG. 6.

In the embodiment of FIG. 7, the control module 202 outputs the synthesized signal S3 to the first conducting wire VIN1 and the second conducting wire VIN2, and the first light emitting group 2031, the second light emitting group 2032, and the third light emitting group 2033 can be simultaneously controlled. For example, when the drive signal S2 is at a high potential, the light emitting diodes 204 of the light emitting groups (2031, 2032, 2033) may generate the first light emission. When the drive signal S2 is at a low potential, the light emitting diodes 204 of the light emitting groups (2031, 2032, 2033) do not generate the first light emission (present an off state). In another example, when the communication command signal S1 is a light emitting signal, the drive module 210 may drive the light emitting module 208 to generate the second light emission. Thereby, when the control module 202 outputs the communication command signal S1 once, the plurality of light emitting groups (2031, 2032, 2033) can be simultaneously controlled, to improve the control performance of the light emitting diode hybrid light string 200.

Based on the above, in some embodiments, the light emitting diode hybrid light string 100 may synthesize a communication command signal S1 and a drive signal S2 to generate a synthesized signal S3 and output the synthesized signal S3 to the first conducting wire VIN1 and the second conducting wire VIN2 through the control module 102. The plurality of light emitting diodes 104 are connected in parallel between the first conducting wire VIN1 and the second conducting wire VIN2, and generate first light emission according to the drive signal S2. The light emitting regulation assembly 106 is connected in parallel between the first conducting wire VIN1 and the second conducting wire VIN2, and configured to generate second light emission according to the communication command signal S1. In this way, the control module 102 may control light emitting effects of the light emitting diodes 104 and/or the light emitting regulation assembly 106 by adjusting the communication command signal S1 and the drive signal S2.

Certainly, the present invention may further have a plurality of other embodiments. A person skilled in the art may make various corresponding changes and variations according to the present invention without departing from the spirit and essence of the present invention. However, such corresponding changes and variations shall fall within the protection scope of the claims appended to the present invention.

What is claimed is:

1. A light emitting diode hybrid light string, comprising:

a first conducting wire;

a second conducting wire;

a control module, configured to synthesize a communication command signal and a drive signal to generate a synthesized signal and output the synthesized signal to the first conducting wire and the second conducting wire;

a plurality of light emitting diodes, wherein the light emitting diodes are connected in parallel between the first conducting wire and the second conducting wire, and generate first light emission according to the drive signal; and a light emitting regulation assembly, connected in parallel between the first conducting wire and the second conducting wire, and configured to generate second light emission according to the communication command signal.

2. The light emitting diode hybrid light string according to claim 1, wherein the communication command signal comprises an always-on command, and the synthesized signal is a superimposition of the always-on command and the drive signal.

3. The light emitting diode hybrid light string according to claim 2, wherein the control module superimposes the always-on command on the drive signal at a command frequency to generate the synthesized signal.

4. The light emitting diode hybrid light string according to claim 3, wherein the drive signal has a first light emitting time, the communication command signal has a second light emitting time, and the first light emitting time is longer than the second light emitting time.

5. The light emitting diode hybrid light string according to claim 4, wherein the command frequency comprises a first command time and a second command time; in a first light emitting mode, the control module intermittently issues the always-on command with the first command time within the second light emitting time; and in a second light emitting mode, the control module intermittently executes the first light emitting mode with the second command time, wherein the second command time is longer than the first command time.

6. The light emitting diode hybrid light string according to claim 1, wherein the light emitting regulation assembly has a light emitting address, the communication command signal has a communication address, and the light emitting regulation assembly generates the second light emission when the light emitting address matches the communication address.

7. The light emitting diode hybrid light string according to claim 1, wherein the light emitting regulation assembly comprises:

a light emitting module, connected in parallel between the first conducting wire and the second conducting wire, and generating the second light emission when being driven; and a drive module, connected in parallel between the first conducting wire and the second conducting wire, and configured to drive the light emitting module according to the communication command signal.

8. The light emitting diode hybrid light string according to claim 1, wherein one of the light emitting diodes has a first conduction direction, another of the light emitting diodes has a second conduction direction, and the first conduction direction is opposite to the second conduction direction.

9. The light emitting diode hybrid light string according to claim 1, wherein there are a plurality of light emitting regulation assemblies, one of the light emitting regulation assemblies has a first conduction direction, another of the light emitting regulation assemblies has a second conduction direction, and the first conduction direction is opposite to the second conduction direction.

10. A light emitting diode hybrid light string, comprising:

a first conducting wire;

a second conducting wire;

a control module, configured to synthesize a communication command signal and a drive signal to generate a synthesized signal and output the synthesized signal to the first conducting wire and the second conducting wire; and a plurality of light emitting groups, connected in series to the control module, wherein each of the light emitting groups comprises:

a plurality of light emitting diodes, generating first light emission according to the drive signal; and a light emitting regulation assembly, connected in parallel to the light emitting diodes, and configured to generate second light emission according to the communication command signal.

* * * * *